US009792625B2

(12) United States Patent
Raji et al.

(10) Patent No.: US 9,792,625 B2
(45) Date of Patent: Oct. 17, 2017

(54) DETERMINING FRAUDULENT INDICATIONS OF ADVERTISEMENT INTERACTION BASED ON IDENTITY

(71) Applicant: Facebook, Inc., Menlo Park, CA (US)

(72) Inventors: Vijaye Ganesh Raji, Remond, VA (US); Jason Duane Clark, Woodinville, CA (US)

(73) Assignee: Facebook, Inc., Menlo Park, CA (US)

( * ) Notice: Subject to any disclaimer, the term of this patent is extended or adjusted under 35 U.S.C. 154(b) by 681 days.

(21) Appl. No.: 14/285,611

(22) Filed: May 22, 2014

(65) Prior Publication Data
US 2015/0339721 A1    Nov. 26, 2015

(51) Int. Cl.
*G06Q 30/02* (2012.01)

(52) U.S. Cl.
CPC ................ *G06Q 30/0263* (2013.01)

(58) Field of Classification Search
CPC .......... G06Q 30/0185; G06Q 30/0225; G06Q 30/0241–30/0253
See application file for complete search history.

(56) References Cited

U.S. PATENT DOCUMENTS

2013/0325591 A1* 12/2013 Delug ............... G06Q 30/0248
                                                         705/14.45

* cited by examiner

*Primary Examiner* — David Stoltenberg
*Assistant Examiner* — Robert C Johnson
(74) *Attorney, Agent, or Firm* — Fenwick & West LLP

(57) ABSTRACT

An ad publisher provides an online system with user identifying information of users who interacted with an advertisement presented by the ad publisher and indications of interactions with the advertisement. A landing page is associated with the advertisement, and the advertiser provides the online system with user identifiers of users who interacted with the advertisement and requested the landing page. The online system determines whether the ad publisher fraudulently identifies interactions with the advertisement by comparing the user identifying information received from the ad publisher with the user identifiers received from the advertiser.

25 Claims, 3 Drawing Sheets

DETERMINING FRAUDULENT INDICATIONS OF ADVERTISEMENT INTERACTION BASED ON IDENTITY

BACKGROUND

This disclosure relates generally to online advertising, and more specifically to identifying advertisement ("ad") publishers fraudulently identifying user interactions with advertisements.

An ad publisher provides advertisements and content to users. Typically, an ad publisher receives compensation from an advertiser or other entity for presenting advertisements associated with the advertisement. Users of client devices may view and interact with advertisements presented by an ad publisher via the client devices. Often, the amount of compensation received by an ad publisher is dependent upon the number of interactions by client device users with advertisements presented by the ad publisher.

However, ad publishers typically provide information identifying the number of interactions with presented advertisements. Motivated by generating higher revenues, an ad publisher may identify more interactions with advertisements to an advertiser or other entity providing compensation than the number of interactions with advertisements performed by actual users. This decreases revenue to advertisers from advertisements presented via ad publishers.

SUMMARY

An online system provides advertisements received from one or more advertisers to an advertisement ("ad") publishing system, which presents advertisements to users of client devices along with additional content. The online system provides an advertisement to an ad publisher, which combines the advertisement with additional content and communicates the advertisement and additional content to one or more client devices for presentation. Each advertisement includes a link to a landing page that includes content presented to a user when the user interacts with the advertisement by selecting the link. The landing page typically contains content related to the advertiser and/or the product or service associated with the advertisement. Client devices communicate user identifying information of the users who interacted with advertisements (e.g., by following the link to the landing page) and optionally additional indications of user interactions (e.g., a purchase) to the ad publisher. The ad publisher then communicates the user identifying information and any additional indications of user interactions to the online system. Additionally, the advertiser communicates user identifiers associated with users who interacted with the advertisement and who accessed the landing page to the online system.

To prevent an ad publisher from providing fraudulent or otherwise incorrect information to the online system about users who interacted with advertisements, the online system determines a value or metric that is indicative of whether the ad publisher has accurately reported the user interactions. In one embodiment, this value is based on the user identifying information provided by the ad publisher and the user identifiers provided by the advertiser. For example, the online system determines the value as a ratio of a number of users from the user identifying information from the ad publisher that do not match a user identifier received from the advertiser to a total number of interactions with advertisements indicated by the ad publisher. If the value exceeds a threshold, the online system identifies the ad publisher providing fraudulent information identifying interactions with advertisements.

In some embodiments, if an ad publisher is identified as providing fraudulent information identifying interactions with advertisements, the online system may apply a fraud protection process based on the fraudulent information. For example, the online system blacklists the ad publisher to prevent the ad publisher from subsequently presenting advertisements from the online system. As another example, the online system may also reduce or forego payment to the ad publisher for the interactions that the ad publisher fraudulently identified.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
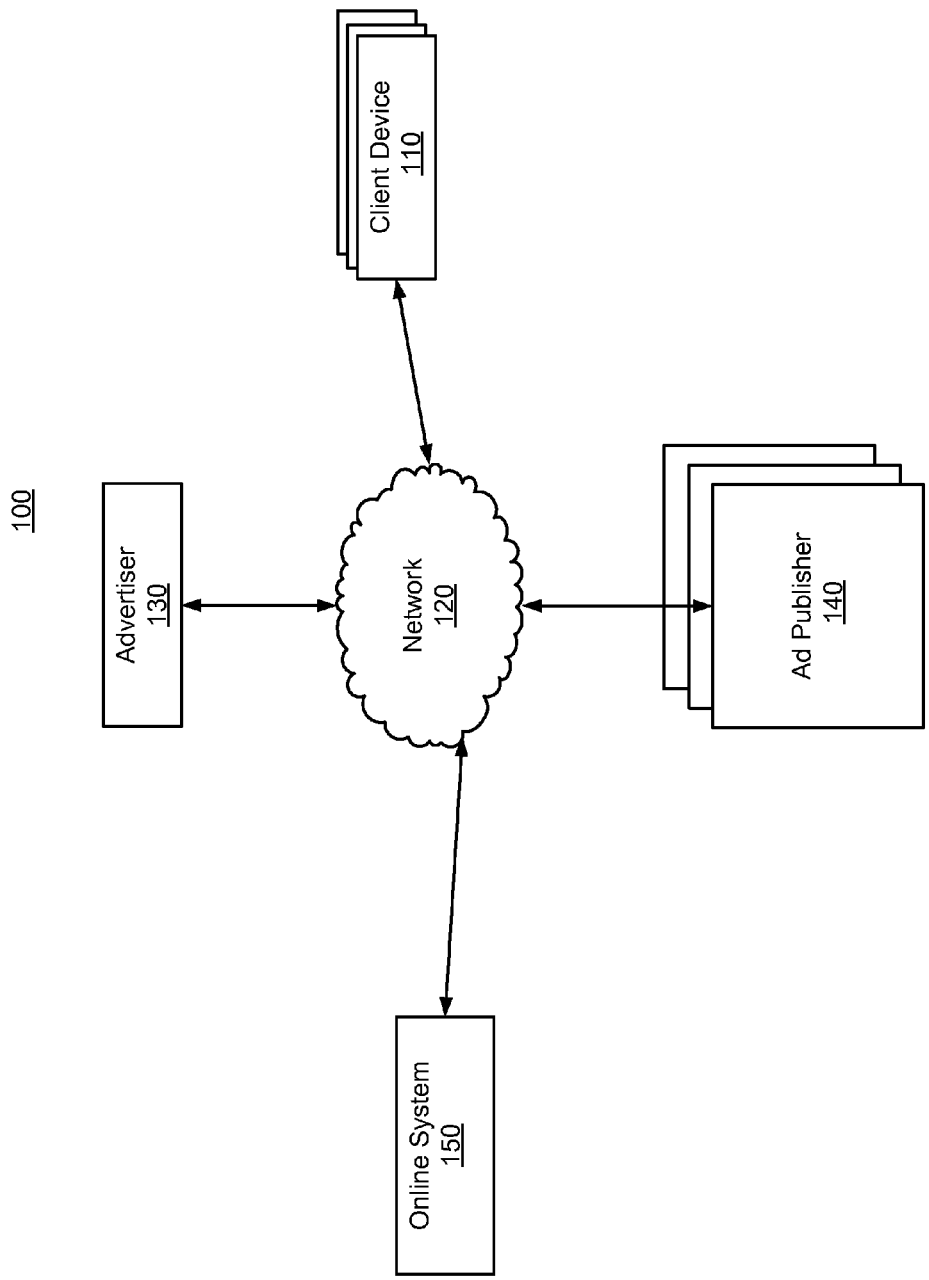
FIG. 1 is a high level block diagram of a system environment, in accordance with an embodiment.

FIG. 1 is a high level block diagram of a system environment 100. The system environment 100 shown by FIG. 1 comprises one or more client devices 110, a network 120, an advertiser 130, one or more advertisement ("ad") publishers 140, and an online system 150. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 150. For example, a client device 110 executes a browser application to enable interaction between the client device 110 and the social networking system 150 via the network 120. In another embodiment, a client device 110 interacts with the online system 150 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

An advertiser 130 creates advertising content for presentation to users of client devices 110. For example, the advertiser 130 generates various advertisements describing products or services. An advertisement may be associated with a landing page specifying content presented to a user when the user interacts with the advertisement. For example, an advertisement is associated with a network address from which the landing page is retrieved and presented to a user when the user interacts with the advertisement. The landing page may be a web page, an application installation interface, or any other suitable content. For example, the landing page is a web page including other content provided by the advertiser 130. In some embodiments, the advertiser 130 communicates advertisements to the online system 150, which selects one or more advertisements for communication to a client device 110, as further described below in conjunction with FIG. 2.

An ad publisher 140 provides one or more advertising spaces (ad spaces) for presenting advertisements via a client device 110. An ad space specifies a location in a user interface in which an advertisement is presented to a user. For example, the ad publisher 140 includes data identifying one or more locations in the user interface and receives an advertisement for presentation in a location. In one embodiment, the ad publisher 140 is a mobile ad publisher, such as a mobile application, and the user interface is on a mobile device, such as the user interface of a mobile application. Additionally, the ad publisher 140 may present other content along with one or more of the advertisements, allowing the ad publisher 140 to combine content with one or more advertisements for presentation via a client device 110.

The online system 150 receives one or more advertisements from an advertiser 130. In an embodiment, an advertiser 130 communicates one or more advertisements to the online system 150, which identifies an advertisement for communication to an ad publisher 140 for presentation via a client device 110. In some embodiments, the online system 150 receives a request for an advertisement from an ad publisher 140 that includes information describing characteristics of a user from the ad publisher 140; based on the characteristics of the user, the online system 150 selects an advertisement and communicates the selected advertisement to the ad publisher 140 for presentation to the user.

Additionally, the online system 150 manages payment to the ad publisher 140 by an advertiser 130. For example, the advertiser 130 provides compensation to the ad publisher 140 when an advertisement from the advertiser 130 is presented by the ad publisher 140 or when a user interacts with an advertisement from the advertiser 130 that was presented by the ad publisher 140. The online system 150 may communicate information to the advertiser 130 based on information received from the ad publisher 140 specifying an amount of compensation for the advertiser 130 to provide to the ad publisher 140 for presenting advertisements from the advertiser 130. While FIG. 1 shows an embodiment where the online system 150 is a single entity, in other embodiments the online system 150 may be implemented using a variety of architectures and configurations having multiple components, modules, and/or servers in communication. For example, the online system 150 may be implemented as a system including one or more of: ad-delivering servers, demand side platforms (DSPs), ad networks (horizontal and vertical), analytic platforms, data management platforms, data aggregators, targeted and behavioral advertising platforms, and/or campaign management systems.

Figure 2:
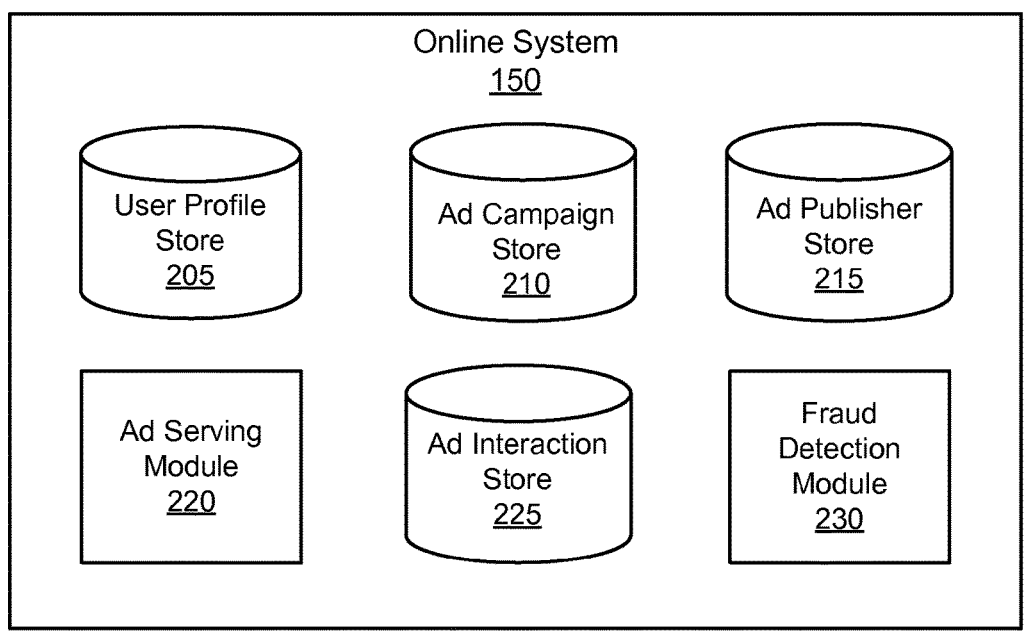
FIG. 2 is an example block diagram of an architecture of the online system, in accordance with an embodiment.

FIG. 2 is an example block diagram of an architecture of the online system 150. The online system 150 shown in FIG. 2 includes a user profile store 205, an ad campaign store 210, an advertisement ("ad") publisher store 215, an ad serving module 220, an ad interaction store 225 and a fraud detection module 230. In other embodiments, the online system 150 may include additional, fewer, or different components for various applications. Conventional components such as network interfaces, security functions, load balancers, failover servers, management and network operations consoles, and the like are not shown so as to not obscure the details of the system architecture. In some embodiments, the online system 150 is a social networking system including information describing various users, connections between users, and content for presentation to users of the social networking system.

Each user of the online system 150 is associated with a user profile, which is stored in the user profile store 205. A user profile includes declarative information about the user that was explicitly shared by the user and may also include profile information inferred by the online system 150. In one embodiment, a user profile includes multiple data fields, each describing one or more attributes of the corresponding user of the online system 150. Examples of information stored in a user profile include biographic, demographic, and other types of descriptive information, such as work experience, educational history, gender, hobbies or preferences, location and the like. A user profile may also store other information provided by the user, for example, images or videos. Additionally, if the online system 150 is a social networking system, a user profile may include information describing connections or relationships between a user and additional social networking system users. In certain embodiments, images of users may be tagged with identification information of users of the online system 150 displayed in an image. A user profile also includes information uniquely identifying the user associated with the user profile. The identifying information may be a user identifier, an email address, a phone number, a cookie identifier, or a hash of any of those to protect privacy.

The ad campaign store 210 stores information associated with one or more advertisement ("ad") campaigns provided by an advertiser 130. Information associated with an ad campaign includes one or more ads included in the ad campaign. Each advertisement specifies content, which is text, image, audio, video, or any other suitable data presented to a user. In various embodiments, an advertisement is associated with a network address specifying a landing page (e.g., a web page, an application installation interface), which is presented to a user when the user interacts with the advertisement.

Information associated with an ad campaign may also include one or more campaign parameters influencing the presentation of ads associated with the ad campaign to users.

Example campaign parameters specified by an ad campaign include one or more objectives of the ad campaign, an ad campaign duration, an ad campaign budget, a bid amount specifying a maximum amount of compensation for presentation or for interaction with an advertisement associated with the ad campaign, and targeting criteria. An objective associated with an ad campaign specifies one or more goals of an advertiser 130 for presentation of advertisements associated with the ad campaign. For example, an objective specifies a total number times advertisements in the ad campaign are presented to users (i.e., a total number of impressions of advertisements in the ad campaign), specifies a total number of unique users to be presented with at least one advertisement associated with the ad campaign, a total number of users accessing a landing page associated with one or more advertisements associated with the ad campaign, a total number of users performing a specified type of interaction with one or more advertisements associated with the ad campaign, or any other suitable criteria.

In addition, a duration associated with the ad campaign specifies a time interval during which ads associated with the ad campaign are presented to users. An ad campaign budget specifies a total amount of compensation that the advertiser 130 has agreed to provide the online system 150 and/or ad publishers 140 in connection with the ad campaign. A bid amount is associated with one or more advertisements specifies the maximum amount of compensation the advertiser 130 will provide to the online system 150 and/or to an ad publisher 140 if an advertisement is presented to a user or if a user interacts with an advertisement presented to the user. Targeting criteria specifies one or more characteristics of users eligible to be presented with one or more advertisements associated with an advertising campaign; targeting criteria may be associated with individual advertisements or associated with an advertising campaign in its entirety. Hence, targeting criteria allow an advertiser to identify users having specific characteristics to be presented with advertisements.

The ad publisher store 215 stores publisher profiles associated with different ad publishers 140. A publisher profile associated with an ad publisher 140 includes information identifying the ad publisher 140 and one or more metrics describing prior interactions between the ad publisher 140 and the online system 150. Examples of metrics stored in a publisher profile associated with an ad publisher 140 include a total number of times the online system 150 has communicated advertisements to the ad publisher 140 to be presented and a rate of conversions from advertisements presented via the ad publisher 140 (i.e., a rate at which one or more types of actions occur when advertisements are presented via the ad publisher 140).

A publisher profile associated with an ad publisher 140 also indicates whether the ad publisher 140 has previously been identified as providing fraudulent information to the online system 150 describing user interactions with advertisements presented using the ad publisher 140. Alternatively, the ad publisher store 215 includes a blacklist including ad publishers 140 that have provided fraudulent information describing user interactions with advertisements presented by the ad publishers 140. An example of fraudulent information describing user interactions with advertisements form an ad publisher 140 is information from the ad publisher indicating 1,000 interactions with an advertisement when only 600 interactions occurred. Identification of fraudulent information describing user interactions form an ad publisher is further described below in conjunction with FIG. 3.

The ad serving module 220 selects from one or more ad campaigns included in the ad campaign store 210 an advertisement for presentation by an ad publisher 140. When the online system 150 receives a request for an advertisement from an ad publisher 140, the ad serving module 220 selects an advertisement from the ad campaign store 210 and communicates the selected advertisement to the ad publisher 140. The ad serving module 220 may use information in the request from the ad publisher 140 to select an advertisement. After receiving a request for an advertisement from an ad publisher 140, the ad serving module 220 determines whether the ad publisher 140 previously provided fraudulent information describing user interactions with advertisements based on information in the ad publisher store 215. In one embodiment, the ad serving module 220 does not select an advertisement for communication to an ad publisher 140 identified as previously providing fraudulent information describing user interactions with advertisements. If the ad publisher 140 from which a request for an advertisement was received is not identified as an ad publisher 140 from which fraudulent information describing user interactions was received, the ad serving module 220 determines whether an ad included in one or more ad campaigns stored in the ad campaign store 210 is suitable for presentation by the ad publisher 140.

To identify an advertisement for presentation by an ad publisher 140, the ad serving module 220 compares campaign parameters associated with one or more ad campaigns and information associated with advertisements in ad campaigns with information in the request for an advertisement received from the ad publisher 140. For example, the request includes a minimum amount of compensation to the ad publisher 140 for presenting an advertisement, and the ad serving module 220 identifies advertisements from one or more ad campaigns associated with bid amounts equaling or exceeding the minimum amount of compensation to the ad publisher. As another example, the ad serving module 220 identifies one or more advertisements having at least a threshold number of targeting criteria satisfied by characteristics of a user to whom the ad will be presented included in the request from the ad publisher 140. In one embodiment, the ad serving module 220 ranks identified advertisements based at least in part on their bid amounts and selects an advertisement to communicate to the ad publisher based at least in part on the ranking.

After selecting an advertisement, the ad serving module 220 communicates the selected advertisement to the ad publisher 140. In some embodiments, the ad serving module 220 communicates a bid amount associated with the selected advertisement to the ad publisher 140, which may use the bid amount along with bid amounts associated with advertisements from other online systems 150 to identify an advertisement for presentation. Alternatively, the ad serving module 220 communicates the bid amount associated with the selected advertisement, and the ad publisher 140 selects a bid amount received from an online system 150 then requests an advertisement from an online system 150 that provided the selected bid amount.

An ad publisher 140 communicates information describing user interactions with advertisements presented by the ad publisher 140 to the online system 150, which stores the information along with an ad publisher 140 identifier in the ad interaction store 225. Examples of user interactions with an advertisement include clicking or otherwise accessing the advertisement, purchasing a product or service associated with the advertisement, installing an application associated with the advertisement, or performing any other suitable interaction. In various embodiments, the ad publisher 140 communicates information identifying users that interacted with an advertisement, such as a user identifier or a device identifier associated with a client device 110 used to interact with the advertisement, along with information describing the interaction. An advertiser 130 also communicates information identifying users who interacted with an advertisement and also accessed content provided by the advertiser to the online system 150. The identifying information may be a user identifier, an email address, a phone number, a cookie identifier, or a hash of any of those. For example, the advertiser 130 communicates user identifiers or device identifiers associated with interacted with users that interacted with an advertisement and accessed a landing page associated with the advertisement and provided by the advertiser 130. The online system 150 also stores the information received from the advertiser 130 and an identifier associated with the advertiser 130 in the ad interaction store 225.

The fraud detection module 230 determines whether an ad publisher 140 has provided fraudulent information describing user interactions with advertisements to the online system 150 by comparing information identifying users received from the ad publisher 150 with information identifying users received from one or more advertisers 130. For example, the fraud detection module 230 compares user identifiers received from an ad publisher 140 describing users who interacted with an advertisement to user identifying information received from an advertiser 130 describing users who interacted with an advertisement and accessed a landing page or other content provided by the advertiser 130. In one embodiment, the fraud detection module determines a ratio of a number of user identifiers received from the ad publisher 140 that do not match user identifying information received from the advertiser 130 to a number of user identifiers received from the ad publisher 140 that match user identifying information received from the advertiser. If the ratio has at least a threshold value, the fraud detection module 230 determines that the ad publisher 140 has provided fraudulent information describing interactions with the advertisement. In some embodiments, a fraud protection process may be performed when an ad publisher 140 is determined to have provided fraudulent information to determine remedial measures to perform. Examples of remedial measures include blacklisting an ad publisher 140 identified as providing fraudulent information describing user interactions or reducing the amount of compensation provided to an ad publisher identified as providing fraudulent information describing user interactions. Identification of ad publishers 140 providing fraudulent information describing user interactions is further described below in conjunction with FIG. 3.

Detecting Ad Publishers Providing Fraudulent Information

Figure 3:
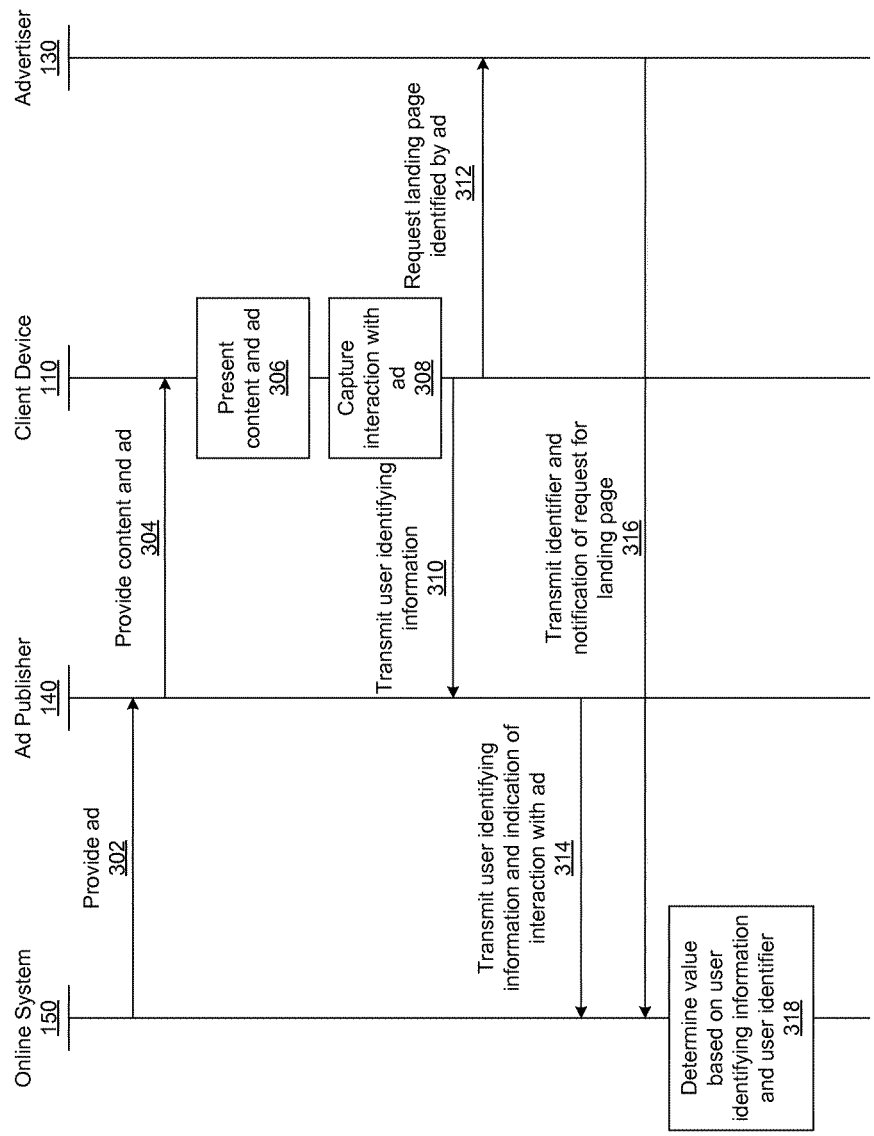
FIG. 3 is an interaction diagram of a method for identifying ad publishers providing fraudulent information describing interactions with advertisements, in accordance with an embodiment.

FIG. 3 is an interaction diagram of a method for identifying an ad publisher 140 providing fraudulent information describing user interactions with advertisements. In various embodiments, the method may include different and/or additional steps than those described in conjunction with FIG. 3. Additionally, in some embodiments, the method may perform certain steps in a different order than shown in FIG. 3.

The online system 150 provides 302 an ad to an ad publisher 140 for presentation to users of one or more client devices 110 by the ad publisher 140. As discussed above in conjunction with FIG. 2, the ad publisher 140 communicates a request for an advertisement to present to the online system 150. If the online system 150 has not previously identified the ad publisher as providing fraudulent information describing user interactions with advertisements, the online system 150 selects an advertisement and provides 302 the selected advertisement to the ad publisher 140 via the network 120. The advertisement provided by the online system 150 includes a network address of a landing page associated with an advertiser 130. For example, the advertisement includes a link to the landing page. When a user interacts with the advertiser 130, the landing page is retrieved and presented to the user. A landing page may be a web page provided and/or maintained by any one of the online system 150, the advertiser 130 or the ad publisher 140. Alternatively, the landing page may be an installation interface for an application or the application itself. Such an application may be provided and/or maintained by any one of the online system 150, the advertiser 130 or the ad publisher 140.

After receiving the advertisement, the ad publisher 140 provides 304 the advertisement and additional content to a client device 110 for presentation to a user. The additional content may be generated by the ad publisher 140 or received by the ad publisher 140 from an external source. In one embodiment, the ad publisher 140 combines the additional content and the advertisement into a page or other content feed that is provided 304 to the client device 110 for presentation to the user. In one embodiment, the user of the client device 110 is associated with a user profile maintained by the online system 150. For example, the user associated with the client device 110.

The client device 110 presents 306 the advertisement and the additional content received from the ad publisher 140. For example, the client device 110 presents 306 the advertisement and the additional content to the user via a display device. If the user interacts with the advertisement, the client device 110 captures 308 the interaction and transmits 310 to the ad publisher 140 user information identifying the user who interacted with the advertisement. The information identifying the user ("user identifying information") may be a unique user identifier associated with the user and stored on the client device 110 or may be a device identifier associated with the client device 110. In one embodiment, the ad publisher 140 includes data or instructions in the page or content feed provided 304 to the client device 110 so the client device 110 transmits 310 the user identifying information when the user interacts with the advertisement via the client device 110. In some embodiments, the ad publisher 140 uses a software development kit (SDK) provided by the online system 150 that executes on the client device 110. The SDK transmits 310 the user identifying information when an interaction with the advertisement is captured 308 by the client device 110. The client device 110 may optionally transmit information identifying the advertisement to the ad publisher 140 along with the user identifying information, allowing the ad publisher 140 to identify advertisement with which the user interacted.

Additionally, the client device 110 requests 312 the landing page associated with the advertisement when the interaction with the advertisement is captured 308. For example, the client device 110 identifies a network address associated with the advertisement and requests 312 content from a source specified by the network address. The client device 110 presents the landing page received from the advertiser 130 to the user. In some embodiments, the network address associated with the advertisement identifies an entity other than the advertiser 130, so the landing page is requested from the identified entity rather than from the advertiser 130.

The ad publisher 140 transmits 314 the user identifying information of the user who interacted with the advertisement via the client device 110 to the online system 150. For example, the ad publisher 140 transmits 314 an indication of the interaction captured 308 by the client device 110 and the user identifying information received from the client device 110 to the online system 150. In some embodiments, the ad publisher 140 transmits 314 information identifying an interaction with the advertisement that was received via the client device 110 without providing user identifying information. The ad publisher 140 may use a software development kit (SDK) provided by the online system 150 that transmits 314 the user identifying information to the online system 150. User identifying information and an indication of user interactions with the advertisement is stored by the online system 150 along with an identifier associated with the ad publisher 140.

Similarly, the advertiser 130 transmits 316 an identifier associated with the user and a notification that the client device 110 associated with the user requested the landing page to the online system 150, which stores the identifier and the notification along with an identifier associated with the advertiser 130. To transmit 316 the identifier associated with the user ("user identifier") and the notification, the landing page may include a tracking mechanism associated with the online system 150 that transmits the identifier associated with the user and the notification when the landing page is accessed by the client device 110. Alternatively, the advertiser 130 transmits 316 the user identifier and the notification via a software development kit (SDK) provided by the online system 150.

The identifier transmitted by the advertiser 130 may be a user identifier associated with the user who interacted with the advertisement or may be a device identifier associated with the client device 110 that captured 308 the interaction with the advertisement. In one embodiment, the request for the landing page transmitted by the client device 110 includes the user identifier, and the advertiser 130 extracts the identifier from the request and transmits 316 the extracted identifier to the online system 150. In an alternate embodiment, the advertiser 130 retrieves the identifier from the client device 110 that requested 312 the landing page.

The preceding steps may be performed for multiple advertisements provided by the online system 150 for presentation by the ad publisher 140. For example, the preceding steps are performed for each advertisement provided by the online system 150 to the ad publisher 140 for presentation. Because the ad publisher 140 transmits 310 user identifying information and the indication of interaction with advertisements provided 304 by the ad publisher 140 to the online system 140, the ad publisher 140 may over report interactions with an advertisement. By fraudulently transmitting 310 user identifying information to the online system 150, the ad publisher 140 may fraudulently increase the amount the online system 150 pays to the ad publisher 140 and/or fraudulently impact the metrics associated with the ad publisher 140 by the online system 150.

To identify potentially fraudulent information from the ad publisher 140, the online system 150 determines 318 a value for the ad publisher 140 based on user identifying information provided by the ad publisher 140 and user identifiers provided by the advertiser 130. In one embodiment, the online system 150 determines 318 the value as a ratio of a number of users identified from the user identifying information provided by the ad publisher 140 that do not match a user identifier provided by the advertiser 130 to a number of users determined from the user identifying information provided by the ad publisher 140. In another embodiment, the value is determined 318 as a ratio of a number of users identified by the user identifying information received from the ad publisher 140 that do not match at user identifier from the advertiser 130 to a total number of interactions with one or more advertisements provided to the online system 150 by the ad publisher 140. Alternatively, if the ad publisher 140 provides information identifying interactions with one or more advertisements provided by the ad publisher 140, the value is determined 318 by comparing the number of interactions identified by the ad publisher 140 with a number of user identifiers received from the advertiser 150; for example, the value is a difference between the number of interactions identified by the ad publisher 140 with the number of user identifiers received from the advertiser 150.

If the determined value exceeds a threshold, the online system 150 identifies the user identifying information received from the ad publisher 140 as fraudulent. The threshold is configurable and may account for scenarios where the ad publisher 140 may transmit 314 user identifying information and indications of interactions but the advertiser 130 is unable to transmit 316 a user identifier matching the user identifying information and notification of a request for a landing page. For example, the ad publisher 140 may transmit 314 user identifying information and an indication of an interaction with an advertisement while the advertiser 130 is unavailable or otherwise unable to communicate information that prevents the advertiser 130 from transmitting 316 a corresponding user identifier.

If the ad publisher 140 is identified as fraudulent, the online system 150 may apply a fraud processing method to the user identifying information received from the ad publisher 140. For example, the online system 150 blacklists the ad publisher for providing fraudulent user identifying information or interactions with an advertisement. The online system 150 maintains information identifying the ad publisher 140 as blacklisted, so the online system 150 does not subsequently provide advertisements to the ad publisher 140 when the ad publisher 140 requests an advertisement. In some implementations, if the value is above the threshold but does not exceed a blacklist threshold, the online system 150 stores information indicating that the ad publisher 140 is on probation. If an ad publisher 140 is on probation, the ad publisher 140 may be blacklisted if the online system 150 again determines that the ad publisher 140 provides fraudulent user identifying information to the online system 150.

Further, if the ad publisher 140 is determined to have provided fraudulent user identifying information, the online system 150 may account for the fraudulently provided user identifying information when determining an amount of compensation to the ad publisher 140 for interactions with advertisements. For example, if the ad publisher 140 is determined to have provided fraudulent user identifying information, the online system 150 withholds payment to the ad publisher 140 for interactions with advertisements presented by the ad publisher 140. As another example, an ad publisher 140 that provided fraudulent user identifying information receives compensation for only identified interactions associated with user identifying information matching a user identifier received from the advertiser 130. However, if the ad publisher 140 not determined to have provided fraudulent user identifying information, the online system 150 typically determines that the ad publisher 140 receives compensation for interactions identified by the ad publisher 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
communicating an advertisement from an online system to an advertisement publisher system for communication to client devices for presentation to users of the online system, the advertisement including a link to a landing page provided by an advertiser, wherein the advertiser provides compensation to the advertisement publisher system for accesses of the landing page by the users of the online system;

receiving, by the online system, user identifying information from the advertisement publisher system identifying one or more users of the online system presented with the advertisement via one or more client devices and who interacted with the advertisement via the one or more client devices;

receiving, by the online system, one or more user identifiers from the advertiser providing the landing page, each of the one or more user identifiers identifying a user of the online system who interacted with the advertisement and accessed the landing page via a corresponding client device;

determining, by a processor, a value based on a number of the one or more user identifiers that do not correspond to one of the identified one or more users;

determining, by the processor, whether the user identifying information received from the advertisement publisher system is fraudulent, by:

determining that the value is greater than a first threshold and less than a blacklist threshold;

responsive to determining that the value is greater than the first threshold and less than the blacklist threshold, storing information indicating that the advertisement publisher system is on probation for a blacklist;

determining that the value is greater than the blacklist threshold; and responsive to determining that the value is greater than the blacklist threshold, including the advertisement publisher system in the blacklist preventing communication of one or more subsequent advertisements provided by the advertisement publisher system for presentation to users of the online system.

2. The method of claim 1, wherein each of the one or more user identifiers is a cookie identifier associated with the corresponding identified user of the online system who interacted with the advertisement and accessed the landing page via the corresponding client device.

3. The method of claim 1 wherein each of the one or more user identifiers is a hash value associated with the corresponding identified user of the online system who interacted with the advertisement and accessed the landing page via the corresponding client device.

4. The method of claim 1, wherein the user identifying information includes user identifiers associated with each of the identified one or more users of the online system.

5. The method of claim 1, wherein the user identifying information includes a device identifier for each of the one or more client devices.

6. The method of claim 1, wherein the landing page comprises an application programming interface.

7. The method of claim 1, wherein the landing page comprises a page of content maintained by the advertiser.

8. The method of claim 1, wherein the landing page includes a tracking mechanism, and the one or more user identifiers are provided from the advertiser to the online system when the tracking mechanism is executed.

9. The method of claim 1, further comprising:
determining the compensation in response to determining that the user identifying information received from the advertisement publisher system is not fraudulent.

10. The method of claim 1, wherein the advertisement publisher system is a mobile application executing on each of the one or more client devices.

11. A method comprising:
communicating an advertisement from an online system to an advertisement publisher system for communication to client devices for presentation to users of the online system, the advertisement including a link to a landing page provided by an advertiser, wherein the advertiser provides compensation to the advertisement publisher system for accesses of the landing page by the users of the online system;

receiving, by the online system, user identifying information from the advertisement publisher system identifying one or more users of the online system presented with the advertisement via one or more client devices and who interacted with the advertisement via the one or more client devices;

receiving, by the online system, one or more user identifiers from the advertiser providing the landing page, each of the one or more user identifiers identifying a user of the online system who interacted with the advertisement and accessed the landing page via a corresponding client device;

determining, by a processor, a value based on a number of the one or more user identifiers that do not correspond to one of the identified one or more users; and determining that the value is greater than a blacklist threshold;

responsive to determining that the value is greater than the blacklist threshold, including the advertisement publisher system in a blacklist preventing communication of one or more subsequent advertisements provided by the advertisement publisher system for presentation to users of the online system.

12. The method of claim 11, wherein each of the one or more user identifiers is a cookie identifier associated with the corresponding identified user of the online system who interacted with the advertisement and accessed the landing page via the corresponding client device.

13. The method of claim 11, wherein each of the one or more user identifiers is a hash value associated with the corresponding identified user of the online system who interacted with the advertisement and accessed the landing page via the corresponding client device.

14. The method of claim 11, wherein the user identifying information includes a device identifier for each of the one or more client devices.

15. The method of claim 11, further comprising:
determining the compensation in response to determining that the user identifying information received from the advertisement publisher system is not fraudulent.

16. The method of claim 11, further comprising:
responsive to determining that the value is greater than a first threshold and less than the blacklist threshold, storing information indicating that the advertisement publisher system is on probation for the blacklist.

17. The method of claim 11, wherein the advertisement publisher is a mobile application system executing on each of the one or more client devices.

18. A computer program product comprising a non-transitory computer-readable storage medium having instructions encoded thereon that, when executed by a processor, cause the processor to:
communicate an advertisement from an online system to an advertisement publisher system for communication to client devices for presentation to users of the online system, the advertisement including a link to a landing page provided by an advertiser, wherein the advertiser provides compensation to the advertisement publisher system for accesses of the landing page by the users of the online system;

receive, by the online system, user identifying information from the advertisement publisher system identifying one or more users of the online system presented with the advertisement via one or more client devices and who interacted with the advertisement via the one or more client devices;

receive, by the online system, one or more user identifiers from the advertiser providing the landing page, each of the one or more user identifiers identifying a user of the online system who interacted with the advertisement and accessed the landing page via a corresponding client device;

determine, by a processor, a value based on a number of the one or more user identifiers that do not correspond to one of the identified one or more users;

determine that the value is greater than the blacklist threshold;

responsive to determining that the value is greater than the blacklist threshold, including the advertisement publisher system in the blacklist preventing communication of one or more subsequent advertisements provided by the advertisement publisher system for presentation to users of the online system.

19. The computer program product of claim 18, wherein the user identifying information includes user identifiers associated with each of the identified one or more users of the online system.

20. The computer program product of claim 18, wherein the user identifying information includes a device identifier for each of the one or more client devices.

21. The computer program product of claim 18, wherein each of the one or more user identifiers is a cookie identifier associated with the corresponding identified user of the online system who interacted with the advertisement and accessed the landing page via the corresponding client device.

22. The computer program product of claim 18, wherein each of the one or more user identifiers is a hash value associated with the corresponding identified user of the online system who interacted with the advertisement and accessed the landing page via the corresponding client device.

23. The computer program product of claim 18, wherein the landing page comprises a page of content maintained by the advertiser.

24. The computer program product of claim 18, wherein the landing page includes a tracking mechanism, and the one or more user identifiers are provided from the advertiser to the online system when the tracking mechanism is executed.

25. The computer program product of claim 18, having further instructions encoded thereon that, when executed by the processor, cause the processor to:
determine the compensation in response to determining that the user identifying information received from the advertisement publisher system is not fraudulent.

* * * * *